United States Patent [19]

Andersen et al.

[11] Patent Number: 4,636,174
[45] Date of Patent: Jan. 13, 1987

[54] CLUSTER COMPUTER BASED EDUCATION DELIVERY SYSTEM

[75] Inventors: David M. Andersen; Donald L. Bitzer, both of Urbana, Ill.; Robert K. Rader, Mt. Kisco, N.Y.; Bruce A. Sherwood, Champaign, Ill.; Paul T. Tucker, Leawood, Kans.

[73] Assignee: University of Illinois, Urbana, Ill.

[21] Appl. No.: 552,947

[22] Filed: Nov. 17, 1983

[51] Int. Cl.$^4$ .............................................. G09B 7/00
[52] U.S. Cl. .................................... 434/335; 434/323
[58] Field of Search ............ 273/85 G, 237; 434/323, 434/335

[56] References Cited

U.S. PATENT DOCUMENTS

| | | | |
|---|---|---|---|
| 4,133,034 | 1/1979 | Etter | 364/464 |
| 4,247,106 | 1/1981 | Jeffers et al. | 273/DIG. 28 |
| 4,348,744 | 9/1982 | White | 273/237 |
| 4,365,297 | 12/1982 | Grisham, Jr. | 364/200 |

FOREIGN PATENT DOCUMENTS 53-120351 10/1978 Japan .
54-85655 7/1979 Japan .
57-150875 9/1982 Japan .

Primary Examiner—Leo P. Picard
Attorney, Agent, or Firm—Pollock, Vande Sande & Priddy

[57] ABSTRACT

An improved computer based education system maintains rapid response to user input without limits to the number of stations. The system incorporates a dedicated processor at each user station so that the user station receives executable code as opposed to a display map. To support plural users a cluster subsystem is provided interconnected to the user stations via a high speed bidirectional communication subsystem. The cluster also includes a mass storage device, a high speed buffer, communications interface and at least one processor for serving user requests.

8 Claims, 3 Drawing Figures

CLUSTER COMPUTER BASED EDUCATION DELIVERY SYSTEM

TECHNICAL FIELD

The present invention relates to efficient delivery of instructional material using computer technology in a clustered environment.

BACKGROUND ART

Computer based education (CBE) systems have been developed over the last 20 years or so to a relatively high degree of sophistication. Although employing computer technology, CBE systems have evolved a set of unique demanding requirements.

In the course of using CBE equipment, the user typically has available an electronic display (such as a CRT) and a keyboard; information may be presented to the user in the form of text and/or graphical matter (akin to a textbook) and the user, via the keyboard, can respond by indicating he has completed his review of the material being presented and is ready for presentation of additional material, he can manifest his understanding of the material by responding to questions and the like. In this scenario speed is obviously important, the user does not want to sit idly by while the machine spends many seconds or more in presenting a new display, or while the machine responds to his keyboarded operations. In a short hand fashion, we can identify some of the criteria for successful interaction; fractional second response and correspondingly fast screen displays and the ability to handle presentations mediated by large, complex programs involving elaborate displays.

Insofar as we are presently aware, the characteristics of CBE have required that it be implemented by a combination of equipment including a relatively large main frame computer and a plurality of terminals (one for each user) which includes both a display and keyboard. The reasons for implementing CBE system using this type of equipment was originally because it was the only available equipment, that is, 20 years ago all computers were what is now termed main frame computers, and only terminals were available for communication with the main frame computer. Since that time, technology has evolved making available minicomputers and even microprocessors; however, for a number of reasons CBE systems is, in the main, not implemented employing this equipment.

The size of the programs which the computer usually executes to provide CBE is one reason which has so far detracted from the applicability of microprocessors since only recently have microprocessors been available with memory capacities in excess of 64 K bytes and that is, even today, considered inadequate. Typical programs require 100 K bytes for the program itself and associated support routines; many require much more memory. In addition, there has been a desire to provide a central repository for maintaining records about the CBE users, their levels of proficiency, lessons completed, etc. While there have been CBE uses with processors akin to microprocessors (and associated with floppy disks for program material storage) this arrangement has proven to be inadequate for at least the inability to centralize user records. Another difficulty exhibited by the microprocessor type equipment is the mechanical nature of the floppy disks and the concomitant delays in transferring program material from the floppy disk to the RAM. Although these delays are relatively short, delays are expected, and that is, from the user's point of view, undesirable. For most CBE purposes the response time should be measured in tenths of seconds; a standard which the floppy disk drive cannot be expected to meet.

One example of the typical CBE system is the system developed at the University of Illinois under the acronym PLATO. Although specialized equipment has been developed for this system, it exhibits the traditional characteristics of CBE in that it relies on a large main frame computer (the CDC Cyber) driving many (more than one thousand) terminals, however the terminals are relatively "dumb" in that all program execution is effected in the Cyber computer. Communication consists of transmitting to the terminal information necessary to produce a display, and transmitting from the terminal to the computer, the user's keyboard entries. This form of delivery is very limiting since it is difficult to envision a single main frame computer running more than two or three thousand terminals. Such an arrangement is then costly (the two or three thousand terminals must support the cost of the main frame machine) due to machine and communication costs.

We can characterize the centralized or traditional CBE architecture as providing good communications (between the central computer and the terminals), the ability to readily update the user proficiency indication and other data bases, the ability to deliver burst processing (because of the high processing speed of the large central computer), as well as the ability to provide effective management tools (especially because of the centralized data collection capability). On the other hand, in contrast, the stand-alone system (typical microprocessor operating from a floppy disk memory) has poor communications characteristics and as a result, updating a central data base is difficult at best, and finally, because of the independent nature of the stand-alone environment, the management tools are ineffective. On the other hand, the centralized architecture exhibits restricted display and processing speed (since all displays are created and all processing is executed by the single central machine), reliability is a problem since a malfunction in the central machine will bring down the entire system, the system typically exhibits high initial system costs, and annual costs including the communication expenses. On the other hand, the stand-alone architecture provides relatively fast local displays (since the display is created locally), there are no communication costs, any failures are soft failures, since each station is independent of others, and there are relatively low initial costs. An improved system will exhibit the advantages of both the stand-alone and the central architecture while avoiding the disadvantages of both.

Notwithstanding this traditional architecture, it should be apparent that an improved delivery system which did not rely so much on the central computer, and provided distributed intelligence at the users' terminals would be desirable from a number of points of view. Under the present arrangement, the number of terminals which can be driven from a single computer is limited, in the event of a computer malfunction, the entire system (with perhaps a thousand terminals) becomes unusable until the central computer can be repaired and geographic dispersion of terminals carries with it high communication costs.

Accordingly, it is one object of the present invention to improve the architecture of CBE systems to allow less costly geographic dispersion of the terminals. It is another object of the present invention to reduce the dependence on a central main frame computer. It is another object of the present invention to achieve the foregoing objects without at the same time impairing the centralized record keeping function exhibited by traditional CBE system architecture or compromising the fast response time now enjoyed by users.

SUMMARY OF THE INVENTION

The invention meets these and other objects by providing one or more CBE clusters which may communicate with each other and/or a central computer. The architecture of the cluster is in the form of a hub which includes a hub subsystem communicating with a plurality of processor stations via a very high speed communication subsystem.

The hub subsystem may include one or more relatively small but powerful microprocessors, a high capacity mass storage device, a high speed buffer and a communications interface. The mass storage device (with the capacity measured at 30 or more megabytes) can store many CBE programs, even though each program may be on the order of 50–100 kilobytes or more. This significantly reduces the dependence on a central computer since once the program material has been loaded in the mass storage device, the hub subsystem can be divorced from the computer and still operate the processor stations. Although the mass storage device is relatively efficient in responding to requests for program material, the delays in accessing this material could produce delays in responding to user inputs. Accordingly, the hub subsystem includes a high speed buffer, whose capacity (for example 500 kilobytes, 1 megabyte or more) allows a number of programs to be stored and accessed more quickly than through the mass storage device.

Although user inputs are, on the electronic scale, relatively slow (measured no more than once every 2–4 seconds) the existence of a large number (10's to several hundred) processor stations run off a single hub subsystem, requires a relatively high capacity communication subsystem connecting the processor stations and the hub subsystem. Finally, the hub subsystem includes at least one processor (in some cases more than one) for managing the mass storage device and the high speed buffer, responding to the user keyboard inputs, extracting appropriate data for the user, and controlling the high speed communications subsystem accordingly.

The processor stations include the typical electronic memory and display exhibited by many CBE system architectures, but in addition include a dedicated processor such as a microprocessor. The processor station is of course in communication with the high speed communication subsystem for receiving program segments and transmitting back to the hub subsystem, program requests and other information derived from the user keyboard inputs. Distinctly different from common CBE system architecture, is the operation of the processor station. For now, with the capacity provided by the dedicated processor, the processor station receives not a display map, as in the conventional architecture, but instead the processor station receives a program segment for execution. Execution of the program segment will generally result in generation of a new display. Thereafter, user keyboard input may result in a modification of the display, or result in the preparation of a message for transmission on the high speed communication subsystem in the event that the user input requires execution of a different program segment. Thus, in contrast to the conventional architecture, it is only some user keyboard inputs which result in the formulation and transmission of a message on the communication subsystem. The instructional programs are actually executed at the "terminal" or processor station rather than in some central facility. This significantly reduces the demand on the hub subsystem.

Since the processor stations may be typical microprocessors whose memory space may be limited to 64 K bytes or even 32 K bytes, we cannot assume that an entire program can be down loaded to the processor station. Rather, the instructional programs are segmented (perhaps as small as 2–3 K bytes) and only one or a few segments are ever simultaneously down loaded. The segments may be rapidly paged into the processor station from the high speed buffer, on demand. The architecture is arranged so that only infrequently will it be necessary to go to the mass storage device in response to a demand from the processor station.

For purposes of delivering programs or program segments for execution at the processor stations, and responding to requests which require down loading of additional programs or program segments, the cluster subsystem is autonomous from any central computer. However, a communication link from the cluster subsystem to a central computer allows for the centralization of user information. After compilation of user information, to build a user proficiency indication by the cluster subsystem the user proficiency indication can be communicated to the central computer so as to maintain the centralized record keeping function of traditional CBE. Alternatively, user proficiency indications may be collected and output (in hard copy format) at the cluster level making the cluster to central communication link optional.

Once the cluster subsystems have been down loaded with appropriate programs, the cluster subsystems can deliver these programs, segmented to meet the capacity requirements of the processor stations, completely autonomous from the central computer and thus can do so even during times when the central computer may not be operating. Since the centralized record keeping function is not time sensitive, these user proficiency indications can be retained at the cluster subsystem until such time as the main computer is operating, and then transmitted to the main computer at that time (if such transmission is required, which is not essential).

Accordingly, the invention provides an interactive instructional multi-processor system for providing instructional programs for execution at one or more processor stations, relieving memory requirements at the processor stations without allowing a perceivable delay to users at said processor stations as a result of paging of instructional program segments, said system comprising:

a cluster subsystem and a plurality of processor stations interconnected by a high speed communication subsystem, in which said cluster subsystem comprises:

at least one mass storage device for storing a library of instructional programs averaging at least about 50 kilobytes each in length, a high speed buffer memory with a capacity for storing plural programs each averaging at least about 50 kilobytes in length, an interface for said high speed communication subsystem, and processor means for managing said mass storage device, said high speed buffer and said interface, said processor means including a bus interconnecting said mass storage device, said high speed buffer, said interface and said processor means, each of said processor stations comprising:

a microprocessor, electronic memory and display, said electronic memory and display controlled by said microprocessor, an interface for bidirectional communication coupled to and controlled by said microprocessor and coupled to said high speed communication subsystem, said high speed communication subsystem including means for supporting high speed bidirectional communication between said cluster subsystem and a plurality of said processor stations at a rate of at least one megabit per second, whereby said electronic memory at said microprocessors need not have a capacity to store an entire instructional program, rather a microprocessor can execute one of said instructional programs in segments without noticeable delay in loading an instructional program segment from said high speed buffer for execution.

BRIEF DESCRIPTION OF THE DRAWINGS

The present invention will now be described so as to enable those skilled in the art to make and use the same in connection with the following of the specification when taken in conjunction with the attached drawings in which like reference characters identify identical apparatus and in which: .

DETAILED DESCRIPTION OF THE INVENTION

Figure 1:
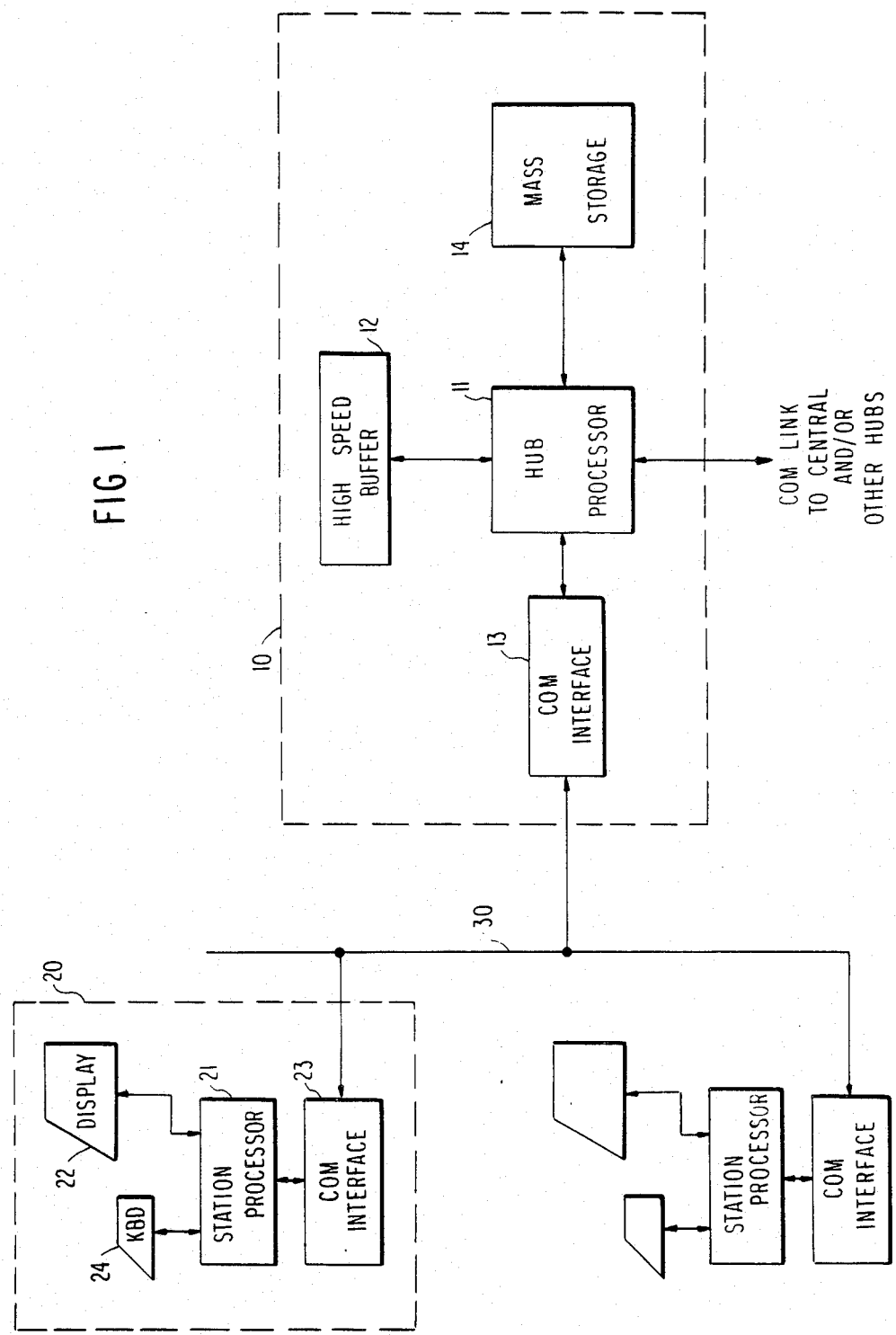
FIG. 1 is a block diagram of a cluster subsystem and associated typical processor stations.

FIG. 1 is a block diagram illustrating a cluster subsystem 10 for storing a plurality of instructional programs for execution by associated apparatus, and for paging program segments to that other apparatus as required, a high speed communication subsystem interconnecting said cluster subsystem and a plurality of processor stations 20. Typically, the processor stations each include a microprocessor and associated electronic memory. Typically, the electronic memory at a processor station does not have the capacity to store even a single instructional program. Rather the instructional programs are segmented into segments (for example 2-3 kilobytes) and transmitted to a requesting processor station. The dimensions or parameters characterizing the various elements are arranged so that for up to some limiting number of processor stations, the delay occasioned by the necessity for extracting a program segment from the cluster subsystem, shipping it to a processor station, storing it in the processor station memory, and executing the stored program segment, presents no more than a barely perceptible delay to the user. For those user keyboard inputs which can be accommodated by the program segment located at the processor station, no communication is necessary between the processor station and the cluster subsystem. There are in fact only two different occasions when the processor station must communicate with the cluster subsystem, and those are when the processor station requires a different program segment than the one located in the electronic memory of the processor station, and those occasions when information is transmitted to the cluster subsystem in order to build a user proficiency indication.

Referring again to FIG. 1, the cluster subsystem includes four components, a mass storage device 14 which may for example comprise a commercially available hard disk, typically 30 megabytes or more, having a typical access time of 50 milliseconds, and a typical transfer time for approximately 50 kilobytes, of another 50 milliseconds. A high speed buffer 12, consisting of preferably 1 megabyte or more of electronic memory is also provided. A hub processor 11 manages the mass storage device 14 and the high speed buffer 12. The high speed buffer 12 preferably has a capacity for storing a number of instructional programs which is related to the number of different processor stations served by the cluster subsystem. Advantage is taken of the fact that when a particular processor station requests a particular program, it only receives a program segment of that program, but nevertheless the entire program is maintained in the high speed buffer 12. Typically, after the processor station has requested the first program segment, it will need another program segment from the same program. By maintaining this program in the high speed buffer 12, we can access and transmit a further program segment from this instructional program without the necessity (and the corresponding delay) of going through the mass storage device 14. The hub processor 11 is coupled to the high speed communication subsystem 30 through a communication interface 13, which is arranged for bidirectional communication, that is the hub processor 11 can respond to messages from the processor stations, and responsive thereto send out program segments, as required.

Finally, the hub processor 11 may also have an additional communication link 15 to a central, e.g. main frame computer and/or other cluster subsystems or hubs. It is this link 15 which firstly enables a plurality of instructional programs to be down loaded to the mass storage device 14, and also is used to transmit user proficiency indications to the central system for permanent or semi-permanent storage to satisfy traditional CBE system requirements. In the absence of communication link 15, the program material is written to the mass storage device 14 by other apparatus.

Figure 2:
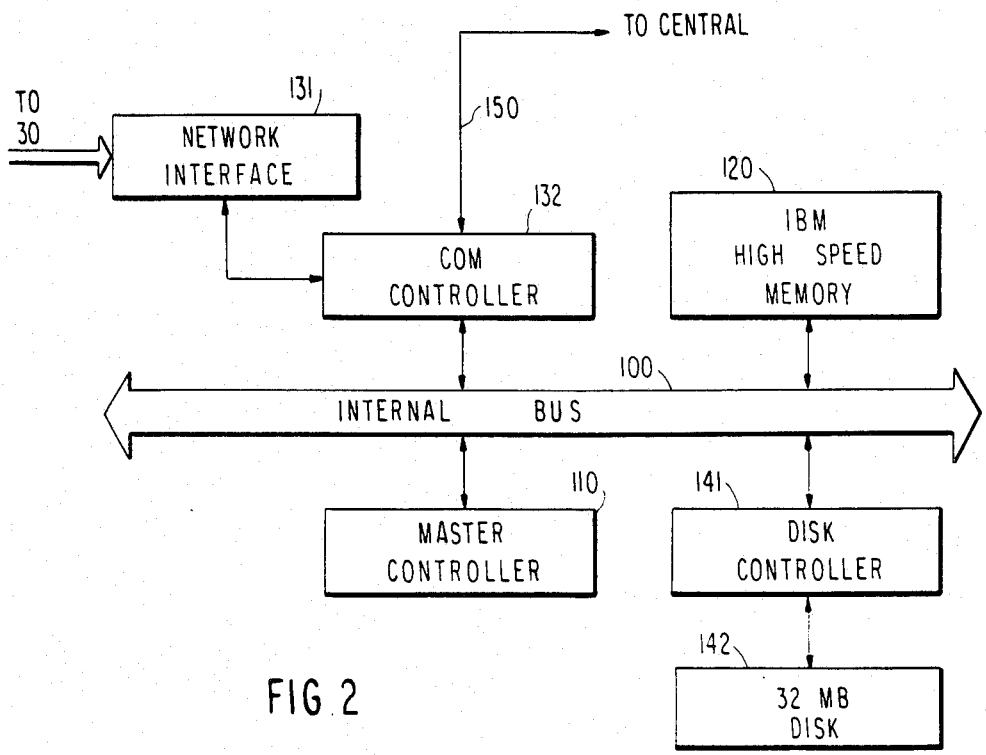
FIG. 2 is a detail block diagram of the cluster subsystem 10.

FIG. 2 is a detail block diagram of a preferred cluster subsystem 10. As shown in FIG. 2, the mass storage device 14 comprises a 32 megabyte hard disk 142 and associated disk controller 141 coupled to an internal bus 100. The high speed buffer consists of a one megabyte high speed memory 120, also coupled to the same internal bus 100. The hub processor 11 is implemented in the form of a pair of controllers. A master controller 110 is provided for managing both the high speed buffer 120 and the mass storage device 141, 142. The communications is effected through a separate communication controller 132 which is directly connected to the communication link 150 as well as to a network interface 131 which is coupled to the high speed communication subsystem 30. Both the master controller 110 and the communication controller 132 are preferably high capacity, high speed microprocessors such as Motorola MCS 68000.

Typical student interaction rates observed with PLATO require that significant processing occur about once every 4 seconds. On the average, about four program segments and system support routines are required to process a typical interaction. The total length of these segments is on the average of 2 K bytes.

To meet these requirements the high speed communication subsystem 30 should have a network transfer rate in the megabit per second range, in one preferred embodiment we have selected 2.25 megabits per second. This rapid rate makes it possible to respond to user inputs in a few milliseconds, a humanly imperceptible delay. Programs of arbitrarily large size can be handled even if the processor station has a small memory, since there is little time penalty paid for paging.

The mass storage devices 14 presently available have typical access times of about 50 milliseconds, and a transfer time of about 50 milliseconds for a 50 kilobyte program. Because of this relatively long delay (100 to 150 milliseconds for a 50 to 100 kilobyte program) our protocol transfers an entire program to the high speed buffer 12, so that (within reason) subsequent requests for different program segments from the same program are satisfied by the high speed buffer 12 and not the mass storage device 14. Typical user interaction requires a major new display relatively infrequently. However, since one segment may call another, we aim to retain a program in the high speed buffer for at least about one second. Accordingly, our goal is to manage the high speed buffer 12 so that the programs stay in the buffer for at least about 1 second before being overwritten.

The average user requires service every 4 seconds. Each use (assuming a 50 kilobyte program) requires 100 milliseconds of mass storage operation, once every 4 seconds, or an average service of 25 milliseconds in every second. Since this is a statistical average, we aim to load the mass storage device to no more than 50% of capacity. Using these parameters, a mass storage device 14 which is busy 500 milliseconds in every second can support 20 users. The high speed buffer 12 should have a sufficient capacity to hold 5 programs (250 kilobytes to 500 kilobytes for programs of 50 to 100 kilobytes each) in order for these programs to be retained for 1 second, since 5 programs can be read from the mass storage device 14 each second. System support routines, which may be invoked by any of the processor stations, are also maintained in the high speed memory 12, in addition to the instructional programs which are paged in and out in response to specific requests.

The average network traffic on the high speed communications subsystem 30, for 20 stations, is relatively low. Using our assumed figure of 2 kilobytes for a program segment, this information must be transferred to an average station every 4 seconds, so that 20 stations in toto would require 10 kilobytes per second ((20 stations×2 kilobytes)/4 seconds)). With our instantaneous transfer rate of 2.25 megabits per second (equivalent to 225 kilobytes per second since each 8-bit data byte is accompanied by two additional bits of communication information), our high speed communication subsystem is on the average busy only 10/225, or about 4% of the time, assuming 20 stations. Even with 100 stations, the communication subsystem would only be busy less than 25% of the time.

While we have discussed a cluster subsystem supporting 20 users, that number of users is merely an example. Degradation can be avoided while increasing the number of users above 20 merely by increasing the size of the high speed buffer, and perhaps increasing the number of mass storage devices 14. The number of mass storage devices is selected so that, based on its access and transfer rates, each mass storage device is, on the average, busy only 50% of the time. Likewise, the high speed buffer is arranged to have a capacity that can assure program retention for on the order of 1 second before the program is overwritten by a newly paged program.

While we have discussed specific parameters for different elements of the system, an important feature of this design is hardware flexibility. The high speed communication subsystem allows us to trade off the size of processor station memory with the high speed buffer memory. That is, as the memory space in the processor station decreases, we require higher average network transfer rates (since the processor station cannot retain as many program segments for reuse), but with average network traffic being low compared to its peak rate, its higher average bandwidth is easily handled. Likewise, the size of the high speed buffer memory can be traded off against the mass storage access and transfer times. The larger the high speed buffer memory capacity, the longer a program will remain in that memory, thus reducing the need to retransfer a program from the mass storage device. Alternatively, we can install additional mass storage devices to permit overlapping accesses to one unit with transfer from another, or to have multiple parallel transfer paths from the mass storage units to the high speed buffer. The higher effective mass storage transfer rates permit a smaller high speed buffer capacity. Because of the distributed processing (the programs actually are executed by the processor station and not by the hub processor), a relatively large number of processor stations can be supported by a relatively simple hub processor. We aim, for example, to support up to 128 processor stations from a single hub, although a cluster system can start out with a small number of processor stations and a small high speed buffer, and as stations are added, additional high speed buffer and/or mass storage units can be added as necessary.

Although there are a wide variety of protocols that can be used with the high speed communication subsystem, the protocol must be designed to operate at high speed with a minimum delay. We have selected a packet system which is controlled at the hub, i.e. a universal poll of the processor stations for requests is repeated at a rapid rate. In the event of multiple responses, our system individually polls responding stations. Even this slower protocol, used only for simultaneous responses, exhibits a typical poll time of about 100 microseconds per processor station. As is illustrated in FIG. 2, we have selected a dedicated processor or communications controller 132 to manage the high speed communication subsystem to avoid interfering with other hub processes.

Figure 3:
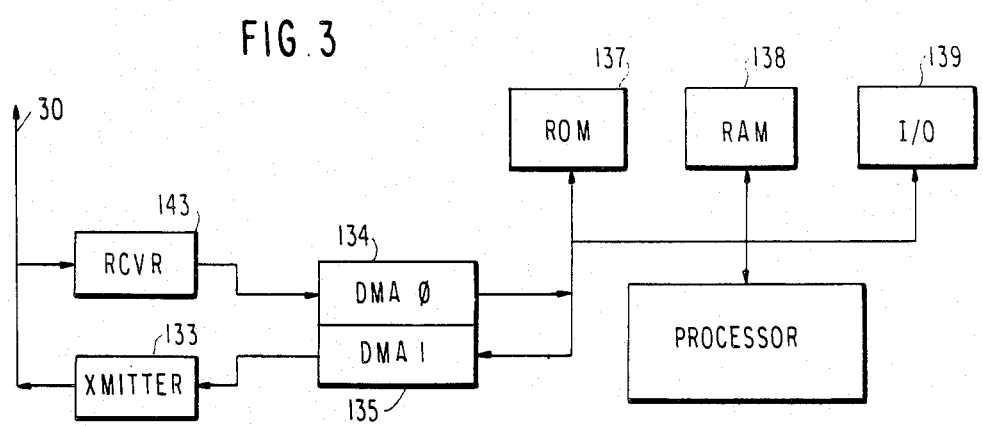
FIG. 3 is a block diagram of a typical processor station communication interface.

In a preferred embodiment, which has actually been constructed, the cluster subsystem (illustrated in FIG. 2) is based on Motorola's EXOR MACS system using the Motorola 68000 microprocessor. The master controller 110 comprised a 68000 with a memory management unit (MMU), the communications controller 132 was an additional Motorola 68000 microprocessor with on-board 64 kilobyte memory. The master controller 110 manages memory (high speed buffer and mass storage) while the communications controller 132 manages the communications. The high speed buffer 120 should be at least 1 megabyte, and more if necessary. FIG. 3 is a detail block diagram of a typical processor station. As shown in FIG. 1, the typical processor station includes a communication interface 23 coupled to a station processor 21 which can be implemented in the form of a microprocessor such as that found in typical personal computers. The station processor is used to drive any conventional display 22 (CRT or gas plasma, or the like) and respond to user keyboard inputs via a keyboard 24.

FIG. 3 is a more detailed block diagram of the station processor communication interface 23. As shown in FIG. 3, this apparatus includes a microprocessor CPU 136 coupled through a bidirectional bus 133 to a I/O port 139, RAM 138, ROM 137, as well as a pair of DMA ports including DMA0 (134) and DMA1(135). The DMA0 port is associated with a receiver 132, whereas the DMA1, port is associated with a transmitter 133, the receiver 143 and transmitter 133 are coupled in turn to the high speed communication subsystem 30. The microprocessor 136 is not the station processor, rather it manages the communication interface 23, and may be implemented as a Z80 or equivalent.

We claim:

1. An interactive instructional multi-processor system for providing instructional programs for execution at one or more processor stations while relieving memory requirements at said processor stations without allowing a perceivable delay to users at said processor stations as a result of paging of instructional program segments, comprising:
   a cluster subsystem and a plurality of processor stations interconnected by a high speed multi-access communication subsystem, in which said cluster subsystem comprises:
   at least one mass storage device for storing a library of instructional programs averaging at least about 50 kilobytes in length,
   high speed buffer means coupled to said mass storage device for simultaneously storing a plurality of instructional programs,
   an interface for said speed communication sub-system, and
   processor means including a digital processor for managing said mass storage device, said high speed buffer means and said interface, said processor means further including a bus interconnecting said mass storage device, said high speed buffer means, said interface and said digtal processor, said digital processing including controller means for transferring a requested instructional program from said mass storage device to said high speed buffer means and for retaining said instructional program in said high speed buffer means for at least a target time related to the plurality of processor stations coupled to said cluster subsystem,
   each of said processor stations comprising:
   a microprocessor, electronic memory of about 64 Kbytes or less and display controlled by said microprocessor,
   an interface for bidirectional communication coupled to and controlled by said microprocessor and coupled to said high speed communication subsystem,
   said high speed communication subsystem including means for supporting high speed bidirectional communication between said cluster subsystem and a plurality of said processor stations at a rate of at least one megabit per second,
   whereby said electronic memory at said microprocessor need not have a capacity to store an entire instructional program, rather a microprocessor can execute one of said instructional programs in segments without noticeable delay in loading an instructional program segment from said high speed buffer means for execution.

2. The system of claim 1 in which said communication subsystem includes means for packetizing and transmitting messages form said cluster subsystem to said processor stations and from said processor stations to said cluster subsystem.

3. The system of claim 1 in which said at least one mass storage device is characterized by an access rate of at least twenty accesses per second and a transfer rate of at least 500 kilobytes per second.

4. The system of claim 3 in which the transfer rate of said mass storage device is at least one megabyte per second.

5. The system of claim 1 in which capacity of said electronic memory and high speed buffer means are selected to be complementary so that as high speed buffer memory capacity is increased, electronic memory capacity is decreased and vice versa.

6. The system of claim 1 which includes a communication link extending between said cluster subsystem and a central computer for the transfer of student data.

7. The system of claim 1 which includes a further interactive instructional multi-processor system and a communication link extending between said interactive instructional multi-processor system.

8. A method of providing interactive instructional programs at one of a plurality of processor stations comprising the steps of:
   (a) providing a mass storage device for storing a number of instructional programs for execution at said processor stations,
   (b) providing a high speed buffer memory of capacity sufficient to simultaneously store a plurality of said instructional programs,
   (c) providing a plurality of processor stations for executing segments of an instructional program in response to a user request,
   (d) providing a multi-access communication sub-system interconnecting said plurality of processor stations and said high speed buffer memory,
   (e) formulating a request for a specific program segment, at a processor station, in response to a user input, and communicating said request to said cluster subsystem via said mult-access communication sub-system,
   (f) responding at said cluster subsystem by extracting the requested program segment from said high speed buffer memory and transmitting said program segment to said requesting processor station via said multi-access communication sub-system.

* * * * *